Aug. 25, 1964 C. B. BINNINGS 3,145,541
EXPANDABLE MANDREL
Filed Feb. 27, 1961 3 Sheets-Sheet 1
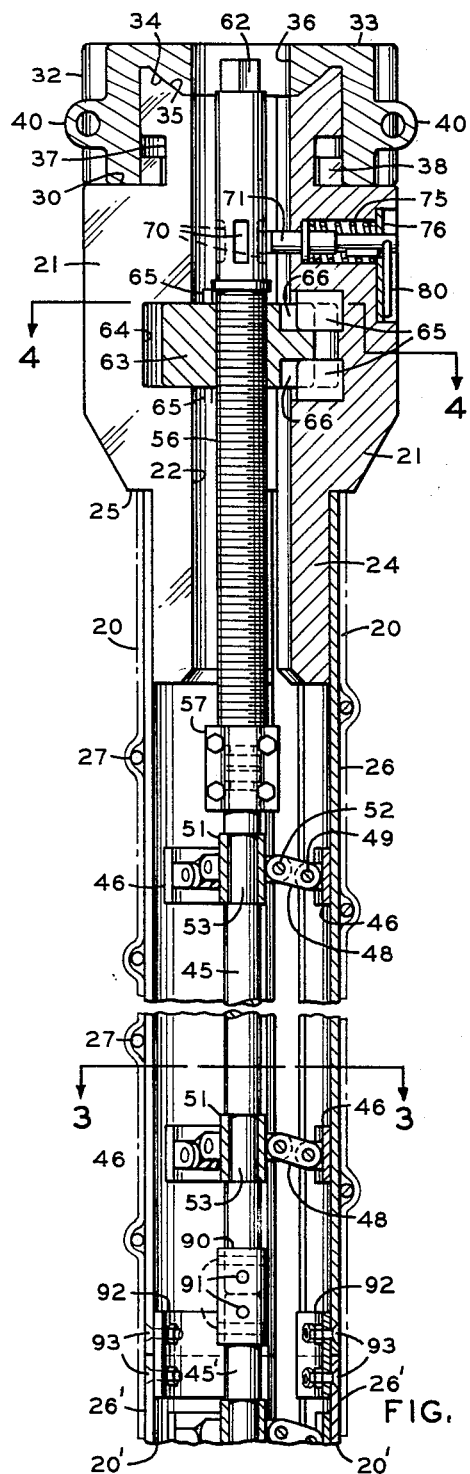
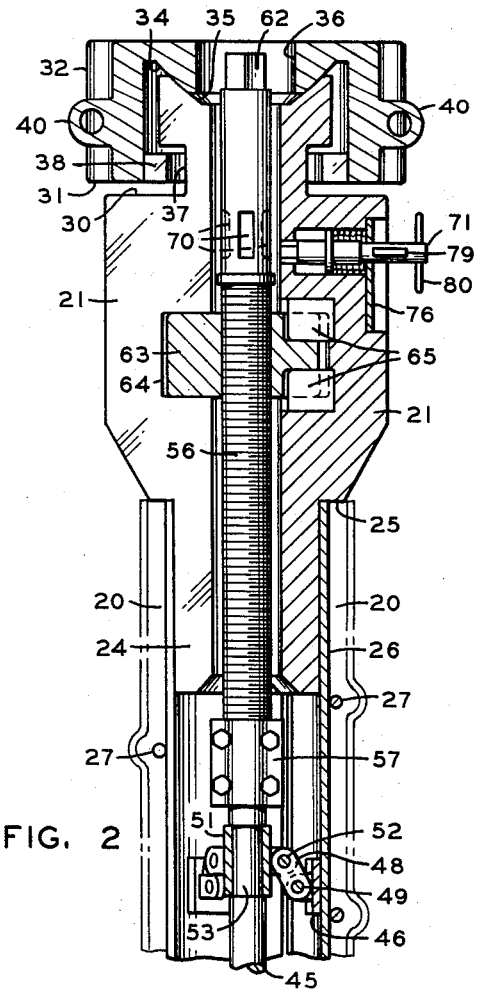
FIG. 2
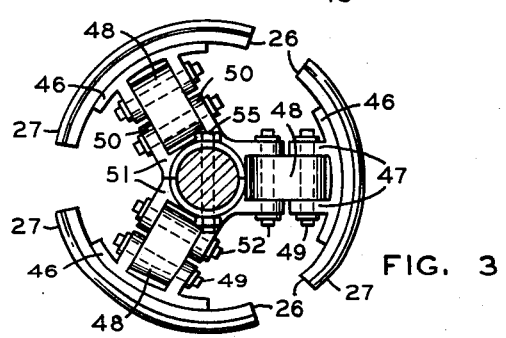
FIG. 3
FIG. 1
INVENTOR
CLEM B. BINNINGS
BY
Kingsland, Rogers & Ezell
ATTORNEYS Aug. 25, 1964  C. B. BINNINGS  3,145,541
EXPANDABLE MANDREL Filed Feb. 27, 1961  3 Sheets-Sheet 2

INVENTOR
CLEM B. BINNINGS
BY
Kingsland, Rogers & Ezell

ATTORNEYS

Aug. 25, 1964    C. B. BINNINGS    3,145,541
EXPANDABLE MANDREL
Filed Feb. 27, 1961    3 Sheets-Sheet 3
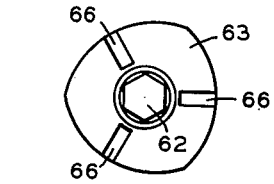
FIG. 5
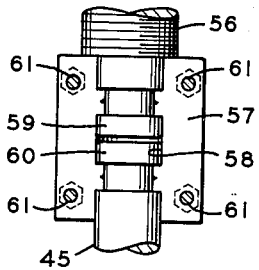
FIG. 7
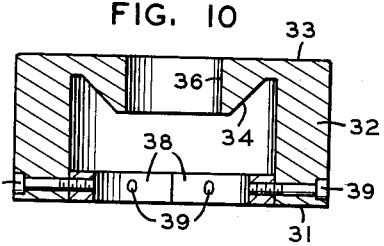
FIG. 11
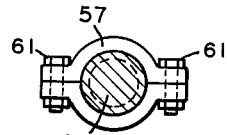
FIG. 12
FIG. 10
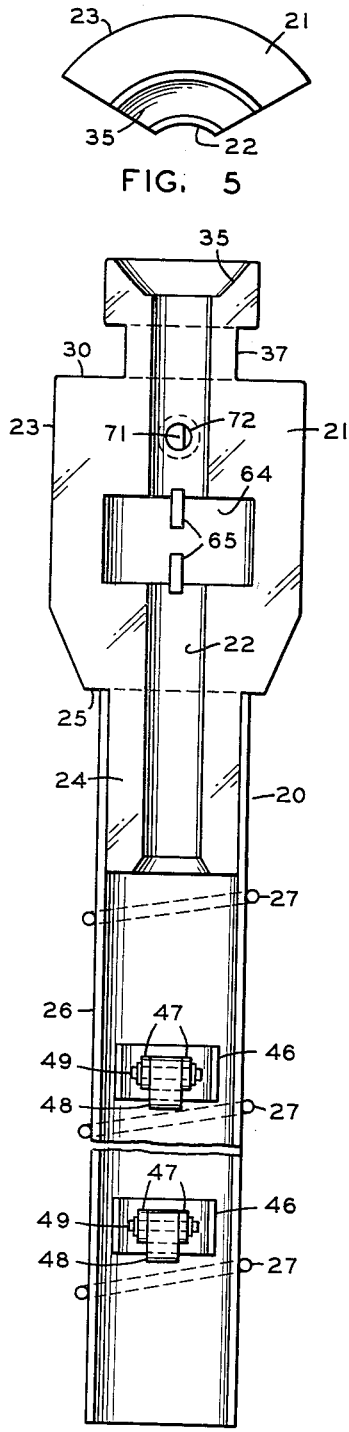
FIG. 6
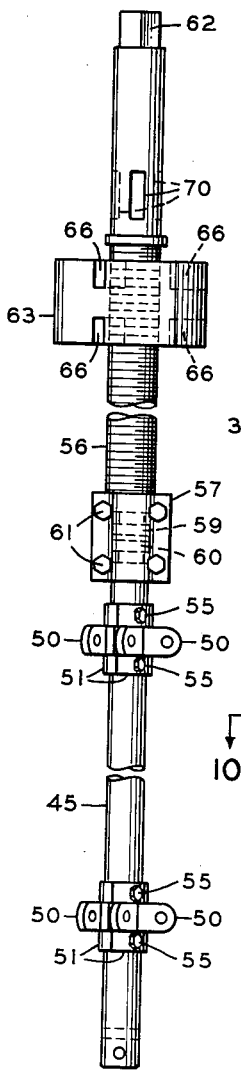
FIG. 8
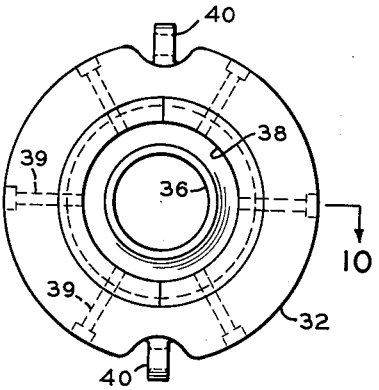
FIG. 9
INVENTOR
CLEM B. BINNINGS
BY
Kingsland, Rogers & Ezell
ATTORNEYS United States Patent Office 3,145,541
Patented Aug. 25, 1964

3,145,541
EXPANDABLE MANDREL
Clem B. Binnings, New Orleans, La., assignor, by mesne assignments, to Whitney National Bank of New Orleans
Filed Feb. 27, 1961, Ser. No. 92,078
9 Claims. (Cl. 61—53.72)

This invention relates to an expandable mandrel for transmitting driving forces to a hollow pile casing.

In general, there are two types of expanding mandrels, these differing principally in the means employed for expanding the expandable parts of the mandrel against the inner side walls of the hollow casing. One type uses pneumatic means for expansion and the other uses mechanical means. This invention is of the latter type.

This mandrel includes a plurality of elongated and vertically expandable segments that are not connected to one another, but that are all connected to a common shaft. The connection of the segments to the shaft is by way of a plurality of toggle links. The shaft is connected to a jacking screw, which in turn, is threaded through a thrust plate, and the thrust plate is laterally slidable within a plurality of recesses in the expandable segments. The recesses prevent the thrust plate from moving vertically relative to the expandable segments, so that when the jacking screw and shaft are rotated, the shaft is moved vertically relative to the expandable segments. This motion of the shaft operates through the toggle links to expand or contract the segments according to the direction of rotation of the jacking screw.

It is, therefore, an object of the invention to provide a mandrel that can be contracted and inserted into a hollow pile casing and then expanded against the inner wall of the casing, the mandrel having mechanical, rather than pneumatic, expansion means with positive operation of the expansion means.

Another object of the invention is to provide means for locking the jacking screw in any rotative position. In the illustrated embodiment, the locking means comprises a spring actuated pin that is releasably receivable within one of a plurality of slots, spaced about the circumference of the jacking screw.

One of the unique features of the invention is the fact that driving forces are transmitted directly to the wall of the hollow casing by way of the expandable segments, rather than by way of the expansion means or through the toggle links. These driving forces are actually delivered to the top of a cap that fits over the heads of the expandable segments, but the forces are transmitted directly to the heads of the segments because the cap rests upon the segments. Hence, another object of the invention is to provide an expandable mandrel with mechanical expanding means and with means for providing transmittal of the driving forces directly to the expandable segments of the mandrel. As a corollary to this object, because the thrust plate in its position within the recesses of the several expandable segments fixes the vertical position of the jacking screw and the shaft relative to the segments, the driving forces are also transmitted to the shaft. The shaft is not required to absorb the entire driving force and transmit it through the toggle links to the expandable segments, but with the reflection of forces through the shaft and toggles, the toggles are not as subject to inertia forces as they would be if the shaft did not receive some of the impact of the driving forces.

Still another object of the invention is to provide an expandable mandrel in which the segments are wedged outwardly with each driving impact to assure the continued engagement of the mandrel with the inner surface of the hollow casing.

Yet another object of the invention is to provide a mandrel that is constructed of relatively few parts and is, therefore, simple and inexpensive to construct. The fewer parts also provide a lighter mandrel that requires lighter driving equipment.

Yet another object of the invention is to provide a mandrel that is readily extendable in length by the simple bolting together of the necessary number of sections.

In the drawings:

FIGURE 1 is a longitudinal sectional view through the center of the mandrel with parts broken away and with the mandrel in the expanded condition;

FIGURE 2 is a view in section similar to the top portion of FIGURE 1, but with the mandrel in the contracted condition;

FIGURE 3 is a view in section taken along the line 3—3 of FIGURE 1;

FIGURE 5 is a top view of a typical one of a plurality of expandable segments;

FIGURE 6 is a side elevation view of an expandable segment, with parts broken away, as seen from the center of the mandrel;

FIGURE 7 is a top view of the expanding assembly;

FIGURE 8 is a side elevation view of the expanding assembly;

FIGURE 9 is a bottom view of the cap piece;

FIGURE 10 is a view in section taken along the line 10—10 of FIGURE 9;

FIGURE 11 is a side elevation view of half of a connecting collar for connecting the jacking screw to the shaft;

FIGURE 12 is a bottom view of the complete collar of FIGURE 11, with the shaft shown in section;

Figure 4:
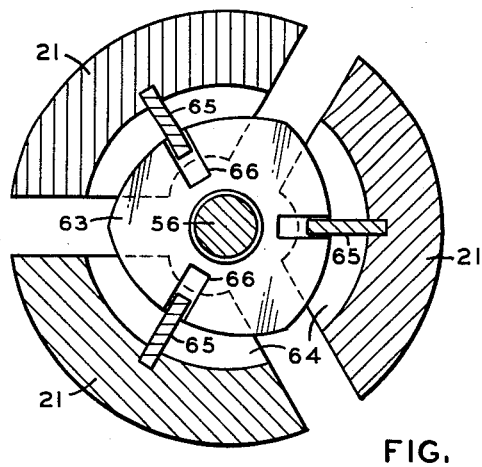
FIGURE 4 is a view in section taken along the line 4—4 of FIGURE 1.
Figure 14:
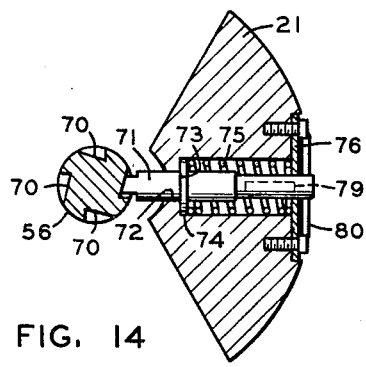
FIGURE 14 is a view in section taken along the line 14—14 of FIGURE 13.
Figure 13:
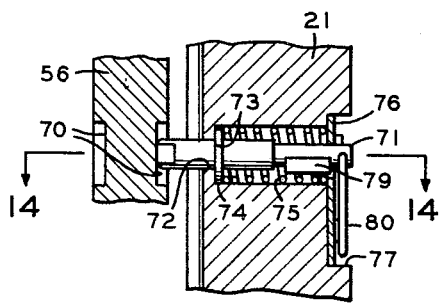
FIGURE 13 is an enlarged sectional view of the keeper for locking the jacking screw.
Figure 15:
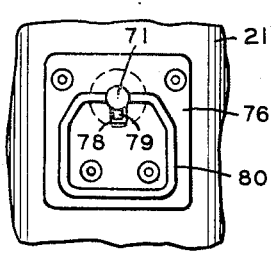
FIGURE 15 is a front elevation view of the keeper.

Referring now to the drawings, the general operating parts include a plurality of elongated, parallel, transversely expandable segments 20. Three of these segments 20 are used in the mandrel illustrated, but they may be increased or decreased in number. The segments 20 are virtually identical so that only one of them need be described in detail. Each of the segments 20 includes a head casting 21 that has an inner surface 22 defining part of a cylinder. The outer surface 23 of each head casting 21 need not take any specific shape, although it is convenient to make it cylindrical also.

The lower wall portion 24 of the head casting is reduced in thickness, defining a shoulder 25 against which the upper edge of a casing-engaging wall 26 abuts. The shape of each casing-engaging wall 26 defines a segment of a cylinder corresponding to the cylindrical shape of a pile casing. Attached to the outer surface of each casing-engaging wall are a plurality of segments 27 that define parts of one or a plurality of spirally wound ribs. These rib segments 27 are positioned to fit within the corrugations of a corrugated pile casing.

The head casting 21 has a horizontal ledge or cap seat 30 against which the lower side 31 of a cap casting 32 rests when the mandrel is in its expanded condition (as illustrated in FIGURE 1). The cap casting 32 has a top 33 that directly receives the impact of driving forces. These forces are transmitted directly to the head casting 21 by the pressure of the cap casting 32 against the cap seat 30.

One of the special features of this invention resides in a unique wedging action whereby the cap casting 32 biases the segments 20 outwardly with each driving impact. This wedging action is provided through the resolution of the forces of these driving impacts into vectors including a lateral component. The resolution of forces is accomplished through the interaction of an annular wedging surface 34 with all of a plurality of wedging surfaces 35 at the upper ends of the several segment heads 21. The annular wedging surface 34 is angled to transmit a radially outward component of each downward force, and each wedging surface 35 is disposed at a downward and inward angle to receive these driving forces. The wedging surfaces 35 react in downward and outward directions in force magnitudes that are delivered directly as downward and outward forces to the casing-engaging walls 26. And the fact of this direct transmittal of downward and outward forces is particularly noteworthy because it means that the expanding assembly (to be described) is not relied upon to withstand the impact of the driving forces.

Of additional importance in the design of the cap casting 32 is the vertical hole 36 that provides access to the space within the inner surfaces 22 of the segment heads 21. Also, the segment heads 21 have horizontal slots 37 that cooperate with one another to define an annular (albeit interrupted) slot for receiving an annular tongue 38 in the form of a ring fastened by cap screws 39 to the inner side surface of the cap casting 32. The slots 37 are taller than the annular tongue 38 to allow for relative vertical movement of the cap casting 32 and the segment heads 21.

There are a pair of partially recessed lifting lugs 40 on opposite sides of the cap casting 32, and when these lifting lugs are engaged by crane hooks and pulled upwardly, the annular tongue 38 bears against the tops of the segment head slots 37 to transmit the lifting force to the entire mandrel.

All of the expandable segments 20 are disconnected from one another, but are connected to a common shaft 45 that extends within the space that separates the inner surfaces of the casing-engaging walls 26. For this connection, there are a plurality of toggle link assemblies, including a plurality of vertically spaced link pads 46 welded or bolted to the inner surface of each casing-engaging wall 26. Each link pad 46 has a pair of spaced link ears 47 between which one end of a toggle link 48 is pivotally supported by a pin 49. The other end of each toggle link 48 is pivotally attached between the ears 50 of a collar 51 that is fixed to and rotatable on the shaft 45. The pivotal attachment is by pins 52. The shaft 45 has reduced sections 53 for receiving the collars 51 so as to prevent vertical sliding of the collars, the collars being split to allow their securement to these reduced shaft sections. The split halves of the collars 51 have opposed flanges 54 that are fastened together with pins or bolts 55 to hold the collars in place.

The mandrel segments 20 are expandable upon vertical motion of the shaft 45, as will be described, and to provide such vertical motion, the upper end of the shaft 45 is fastened to the lower end of a threaded jacking screw 56. To provide this attachment, there is a two-element collar 57 that has an annular recess 58 for receiving a pair of abutting flanges 59 and 60, one being on the upper end of the shaft 45 and the other on the lower end of the jacking screw 56. The halves of the collar 57 are held together by four socket head bolts 61. It should be noted that the collar 57 allows relative rotation, but not vertical movement, of the jacking screw and shaft.

The jacking screw has a bolt head 62 at its top so that it can be turned by a wrench. Below the bolt head, the jacking screw is threaded through a thrust plate 63. The thrust plate is received within all of a plurality of recesses 64, one such recess being provided in each segment head 21. The height of the recesses 64 is about the same as the height of the thrust plate 63, so there is very little vertical movement of the thrust plate within the recesses. The segment heads 21 can, however, readily slide transversely relative to the thrust plate 63.

Each of the segment heads 21 has a pair of superposed keys 65 fastened within its recess 64, and these keys loosely fit within a like number of slots 66 in the thrust plate 63 to prevent the thrust plate 63 from rotating with the jacking screw 56. Therefore, as the jacking screw is rotated, it is threaded upwardly or downwardly within the thrust plate 63, and, because the thrust plate is limited against vertical movement relative to the segments 20 by the confines of the recesses 64, the jacking screw moves vertically relative to these segments 20. Consequently, the toggle sleeves 51 move vertically relative to the toggle pads 46, which alternately pivots the toggle links 48 toward vertical and horizontal dispositions according to the direction of rotation of the jacking screw 56.

Finally, the mandrel has releasable means to lock the jacking screw against rotation from a selected position. For this purpose, there are a plurality of bevelled slots 70 spaced about the circumference of the jacking screw 56, conveniently located between the bolt head 62 and the thrust plate 63. At the level of the bevelled slots 70 is a locking bolt 71 that extends through a hole 72 in one of the segment heads 21. The hole 72 is countersunk to form a pressure seat 73, and the pin 71 has a flange 74 around it that is pressed against the seat by a compression spring 75. A plate 76 is bolted across the outer opening of the countersunk hole 72, within a recess 77, and the spring 75 presses against the inner surface of the plate 76. The plate has a key-shaped hole 78 through it from which the outer end of the shaft projects, with the slot portion of the keyhole 78 allowing the passage of a keeper 79 that is fixed to the pin 71. The keeper 79 holds the pin outward, with the tapered end of the pin free of the slots 70, when the pin is pulled and rotated. A ring handle 80 facilitates retraction of the pin 71.

The bevelled slots 70 and the spring operated pin cooperate to act as a one-way locking ratchet, allowing the jacking screw 56 to be rotated in a mandrel expanding direction, but preventing rotation of the jacking screw in the opposite direction unless the pin is retracted.

The mandrel can be increased in length by superposing and fastening together any number of expandable sections. As illustrated in FIGURE 1, there is another section that comprises a plurality of segments 20', each similar to the already described expandable segments 20. These expandable segments 20' are connected through a toggle link mechanism to a central shaft 45'. The shaft 45' is connected to the shaft 45 by a collar 90 which is fastened to the shaft by a plurality of pins or bolts 91. Also, there are a plurality of splice plates 92 fastened to the inner surfaces of the abutting walls 26 and 26'. These splice plates 92 assure the direct transmittal of driving forces from the upper segment walls 26 to the lower segment walls 26'.

When it is desired to shorten the mandrel, the pins or bolts 91 and the collar 90, as well as the bolts 93 and the splice plates 92, are removed. Since these are the only connections between the sections of the mandrel, the lower section that includes the expandable segments 20' can then be drawn away from the mandrel.

One of the important features of this mandrel is its relatively few number of parts and ease of construction. The mandrel can be assembled by first threading the jacking screw 56 through the thrust plate 63, and thereafter attaching the shaft 45 to the jacking screw by fastening the collar 57. Next, the split toggle collars 51 may be connected to the recessed sections 53 of the shaft 45 by their pins or bolts 55 and the toggle links 48 fastened to these collars by the pins 52.

After the casing engaging walls 26 are welded or bolted to the segment heads 21, the toggle pads 46 may be welded to the inner surface of each casing engaging wall. Then, the expandable segments 20 may be positioned about the expanding means and the toggle links 48 connected to the link pads 46.

The cap casting 32 is positioned by first placing the halves of the annular tongue 38 within the slots 37. Then the cap 32 is attached to the annular tongue by the socket head bolts 39.

Finally, the locking pin 71 is pushed through the hole 72, followed by the compression spring 75, and then the plate 76 is bolted to the segment head that has the locking pin 71.

In operation, the mandrel is prepared for insertion into a hollow pile casing by rotation of the jacking screw 56 in a direction that will thread it upwardly through the thrust plate 63. The jacking screw 56 is rotated by a hand-operated or pneumatic wrench engaged with the bolt head 62. As the jacking screw 56 is threaded upwardly, the keys 65 prevent the thrust plate 63 from rotating. At the same time, the limitations of the recesses 64 prevent the thrust plate 63 from moving vertically relative to the expandable segments 20. Consequently, the jacking screw 56 is raised relative to the expandable segments, thereby operating through the collar 57 to raise the shaft 45. As the shaft 45 raises, it pivots the toggle link 48 to the position illustrated in FIGURE 2, which pulls the segments 20 inwardly. All of this is accomplished with the locking pin 71 in retracted position, as illustrated in FIGURE 2. In this retracted position, the mandrel can be easily inserted into a pile casing.

When the mandrel is fully extended within the casing so that the upper edge of the casing abuts the shoulder 25 at the lower side of the segment heads 21, the mandrel can be expanded. The expansion is performed by rotating the jacking screw 56 in the opposite direction from that already rotated, which extends the shaft 45 downwardly relative to the expandable segments 20. As a result, the toggle links 48 are extended toward horizontal positions, forcing the expandable segments outwardly against the inner surface of the hollow casing. The rib sections 27 are positioned to fit within the corrugations of the casing. When the mandrel is completely expanded, as illustrated in FIGURE 1, the locking pin 71 is turned and allowed to seat under the force of the compression spring 75. (Actually, the pin may be left in the extended position during expansion of the mandrel because of the tapered side of the slots 70. In other words, the pin 71 only locks the shaft 57 against rotation in an mandrel contracting direction.)

When the mandrel is expanded, the cap casting 32 rests upon the upper surfaces 30 of the segment heads 21. The wedging surface 34 also rests against the wedging surfaces 35 of the segment heads 21. Therefore, as downward driving forces are applied to the cap casting 32 these are transmitted directly to the segment heads and are applied directly to the casing. In addition, the wedging surfaces 34 and 35 bias the segments outwardly during driving of the casing.

Various changes and modifications may be made within the process of this invention as will be readily apparent to those skilled in the art. Such changes and modifications are within the scope and teaching of this invention as defined by the claims appended hereto.

What is claimed is:

1. A mandrel for transmitting driving forces to a hollow pile casing comprising a plurality of elongated transversely movable segments, each of at least some of the segments having an upper bearing surface, a recess in the inner side of each segment adjacent the upper end thereof, a thrust plate received within the recesses, a jacking screw threaded through the thrust plate and having articulate connections to the segments for expanding the segments against the inner surface of a pile casing, means for transmitting a driving force against the bearing surfaces of the expanded segments, and means comprising wedging surfaces on the segments engageable by opposed wedging surfaces on the force transmitting means for biasing the segments toward their expanded conditions each time the driving force is transmitted.

2. The combination of claim 1 wherein the force transmitting means comprises a cap having a lower bearing surface for bearing against the upper bearing surfaces of the segments.

3. A mandrel for transmitting driving forces to a hollow pile casing for driving the casing into the ground comprising a plurality of elongated segments, each segment having outer surface means for engaging the inner surface of the casing, each segment having inner surface means cooperative with the inner surface means of the other segments to define a longitudinal central space, a jacking screw extending within the space parallel to the segments, a plurality of toggle levers pivotally connected at one end to the jacking screw, each of the segments having a pivotal connection to the other ends of some of the toggle levers, a thrust plate through which the jacking screw is threaded, each segment having a recess for receiving a side of the thrust plate, the recess providing upper and lower bearing surfaces for preventing more than a small amount of longitudinal movement of the thrust plate relative to the segments, the segments being movable away from the jacking screw through the action of the toggle levers when the jacking screw is rotated, the thrust plate being large enough and the recesses being deep enough to maintain contact between the thrust plate and either the upper or lower bearing surfaces when the segments are expanded.

4. The mandrel of claim 3 wherein the jacking screw has a plurality of grooves spaced about its circumference at a common axial position along the screw with a spring loaded locking plunger extending through one segment and having an end biased toward entry into an opposing groove.

5. The mandrel of claim 4 including means for releasably locking the locking pin with its biased end retracted from the grooves.

6. A mandrel comprising a plurality of long generally parallel segments surrounding a central space for engaging the inner wall of a hollow pile casing, a jacking screw extending longitudinally through the central space, a plurality of collars spaced along the length of the jacking screw, means to permit rotation of the jacking screw within the collars while preventing longitudinal movement of the jacking screw relative to the collars, a plurality of toggle links pivotally connected between the collars and the segments, each segment having an enlarged head at is upper end, a driving force transmitting device in contact with the upper ends of the enlarged heads, means on the enlarged heads and on the driving force transmitting device for wedging the segments outwardly upon the application of downward driving forces upon the mandrel, a thrust plate through which the jacking screw is threaded, means defined by at least one of the heads for preventing the thrust plate from moving longitudinally relative to the segments while permitting lateral movement of the segments, and blocking means between the thrust plate and at least one enlarged head for preventing rotation of the thrust plate when the jacking screw is rotated.

7. The mandrel of claim 6 wherein the last mentioned means comprises relatively slidable stops on the thrust plate and at least one head.

8. A mandrel for transmitting driving forces to a hollow pile casing comprising a plurality of elongated transversely movable segments, each of at least some of the segments having an upper bearing surface, a recess in the inner side of each segment adjacent the upper end thereof, a thrust plate received within the recesses, a shaft extending through the thrust plate and having articulate connections to the segments for expanding the segments against the inner surface of a pile casing when the shaft is vertically reciprocated relative to the thrust plate, means for vertically reciprocating the shaft relative to the thrust plate, means for transmitting a driving force against the bearing surfaces of the expanded segments, and means comprising wedging surfaces on the segments engageable by opposed wedging surfaces on the force transmitting means for biasing the segments toward their expanded conditions each time the driving force is transmitted.

9. A mandrel for transmitting driving forces to a hollow pile casing for driving the casing into the ground comprising a plurality of elongated segments, each segment having outer surface means for engaging the inner surface of the casing, each segment having inner surface means cooperative with the inner surface means of the other segments to define a longitudinal central space, a shaft extending within the space parallel to the segments, a plurality of toggle levers pivotally connected at one end to the shaft, each of the segments having a pivotal connection to the other ends of some of the toggle levers, a thrust plate through which the shaft extends, each segment having a recess for receiving a side of the thrust plate, the recess providing upper and lower bearing surfaces for preventing more than a small amount of longitudinal movement of the thrust plate relative to the segments, the segments being movable away from the shaft through the action of the toggle levers when the shaft is vertically reciprocated, means for vertically reciprocating the shaft relative to the thrust plate, the thrust plate being large enough and the recesses being deep enough to maintain contact between the thrust plate and either the upper or lower bearing surfaces when the segments are expanded.

References Cited in the file of this patent

UNITED STATES PATENTS

| | | |
|---|---|---|
| 977,356 | Withrow | Nov. 29, 1910 |
| 1,542,037 | Cortes | June 16, 1925 |
| 2,684,577 | Smith | July 27, 1954 |
| 2,881,593 | Cobi | Apr. 14, 1959 |

FOREIGN PATENTS

| | | |
|---|---|---|
| 235,037 | Germany | May 29, 1911 |

OTHER REFERENCES

Ingenious Mechanisms for Designers and Inventors (publication), copyright 1930, the Industrial Press, pp. 29–31.